(12) United States Patent
Ikeda et al.

(10) Patent No.: US 8,005,590 B2
(45) Date of Patent: Aug. 23, 2011

(54) WIPER CONTROL METHOD AND WIPER CONTROL SYSTEM

(75) Inventors: Takeshi Ikeda, Kiryu (JP); Narimitsu Kobori, Kiryu (JP)

(73) Assignee: Mitsuba Corporation, Gunma (JP)

( * ) Notice: Subject to any disclaimer, the term of this patent is extended or adjusted under 35 U.S.C. 154(b) by 686 days.

(21) Appl. No.: 12/083,561

(22) PCT Filed: Oct. 25, 2006

(86) PCT No.: PCT/JP2006/321213
§ 371 (c)(1),
(2), (4) Date: Apr. 14, 2008

(87) PCT Pub. No.: WO2007/052503
PCT Pub. Date: May 10, 2007

(65) Prior Publication Data
US 2009/0132115 A1 May 21, 2009

(30) Foreign Application Priority Data
Oct. 31, 2005 (JP) ................................. 2005-316161

(51) Int. Cl.
*G06F 7/00* (2006.01)
(52) U.S. Cl. .......... 701/36; 701/49; 318/65; 318/DIG. 2
(58) Field of Classification Search .................... 701/29, 701/36, 49; 318/34, 65, 282, DIG. 2
See application file for complete search history.

(56) References Cited

U.S. PATENT DOCUMENTS
| | | | |
|---|---|---|---|
| 4,723,101 A * | 2/1988 | Bauer et al. | 318/443 |
| 5,333,351 A * | 8/1994 | Sato | 15/250.13 |
| 2006/0113942 A1 | 6/2006 | Amagasa | |

FOREIGN PATENT DOCUMENTS
| | | | |
|---|---|---|---|
| JP | 2503970 | | 4/1996 |
| JP | 2002-264773 | * | 9/2002 |
| WO | 2004/054856 | | 7/2004 |
| WO | 2005/097569 | | 10/2005 |

OTHER PUBLICATIONS

International Search Report issued Nov. 21, 2006 in the International (PCT) Application of which the present application is the U.S. National Stage.
International Preliminary Report on Patentability issued May 15, 2008 in the International (PCT) Application of which the present application is the U.S. National Stage.

* cited by examiner

*Primary Examiner* — Gertrude Arthur Jeanglaud
(74) *Attorney, Agent, or Firm* — Wenderoth, Lind & Ponack, L.L.P.

(57) ABSTRACT

When a wiper is started, a wiper arm is moved at first in the backward path direction (S1). If a motor is locked (S2) before an original point position signal is outputted, a reciprocating operation for moving the wiper arm temporarily in the forward path direction and then moving the wiper arm again in the backward path direction is performed (S5-S8, S1). When an absolute position signal is not outputted even after repeating the reciprocating operation a plurality of times (S5) and the original point position cannot be recognized (S2, S5), the motor is not forced furthermore but stopped (S5→END) On the other hand, if the motor is not locked when the wiper arm is moved in the backward path direction (S1) and the original point position can be recognized (S2, S3), wiping control is performed (S4) by calculating the wiper arm position based on the original point position and the motor rotation pulse.

8 Claims, 11 Drawing Sheets

[FIG. 1]
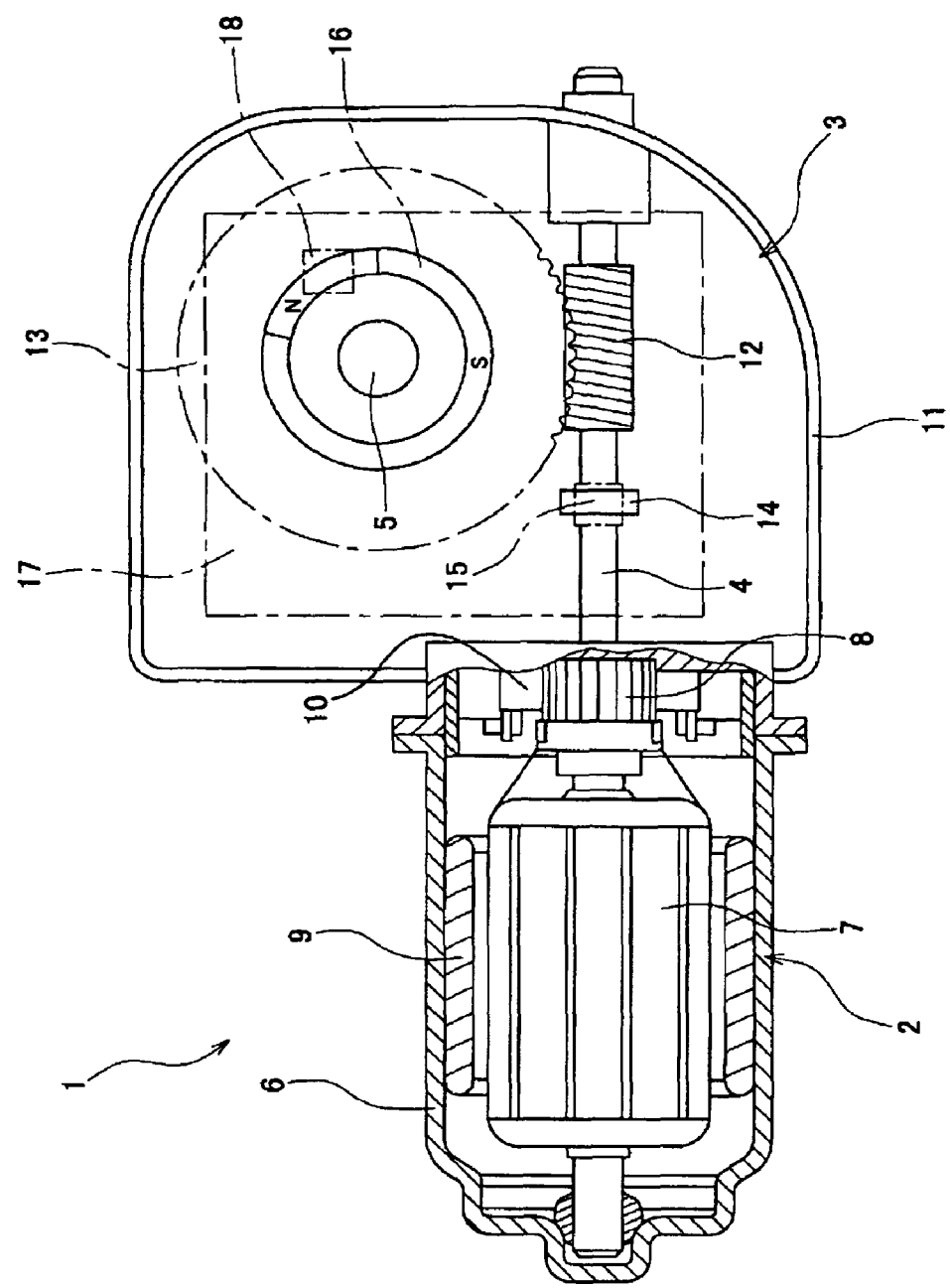

[FIG. 2]
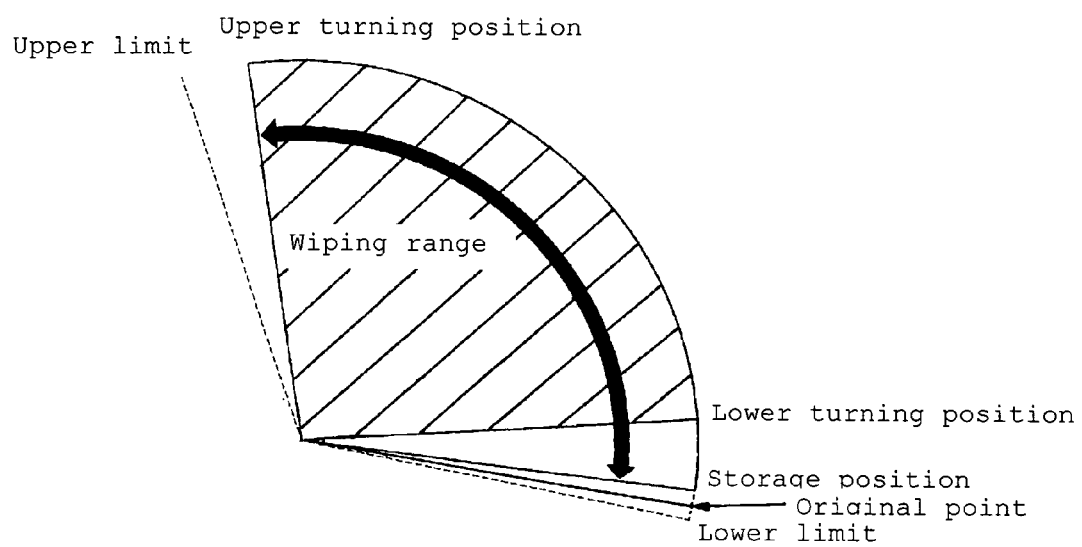

[FIG. 3]
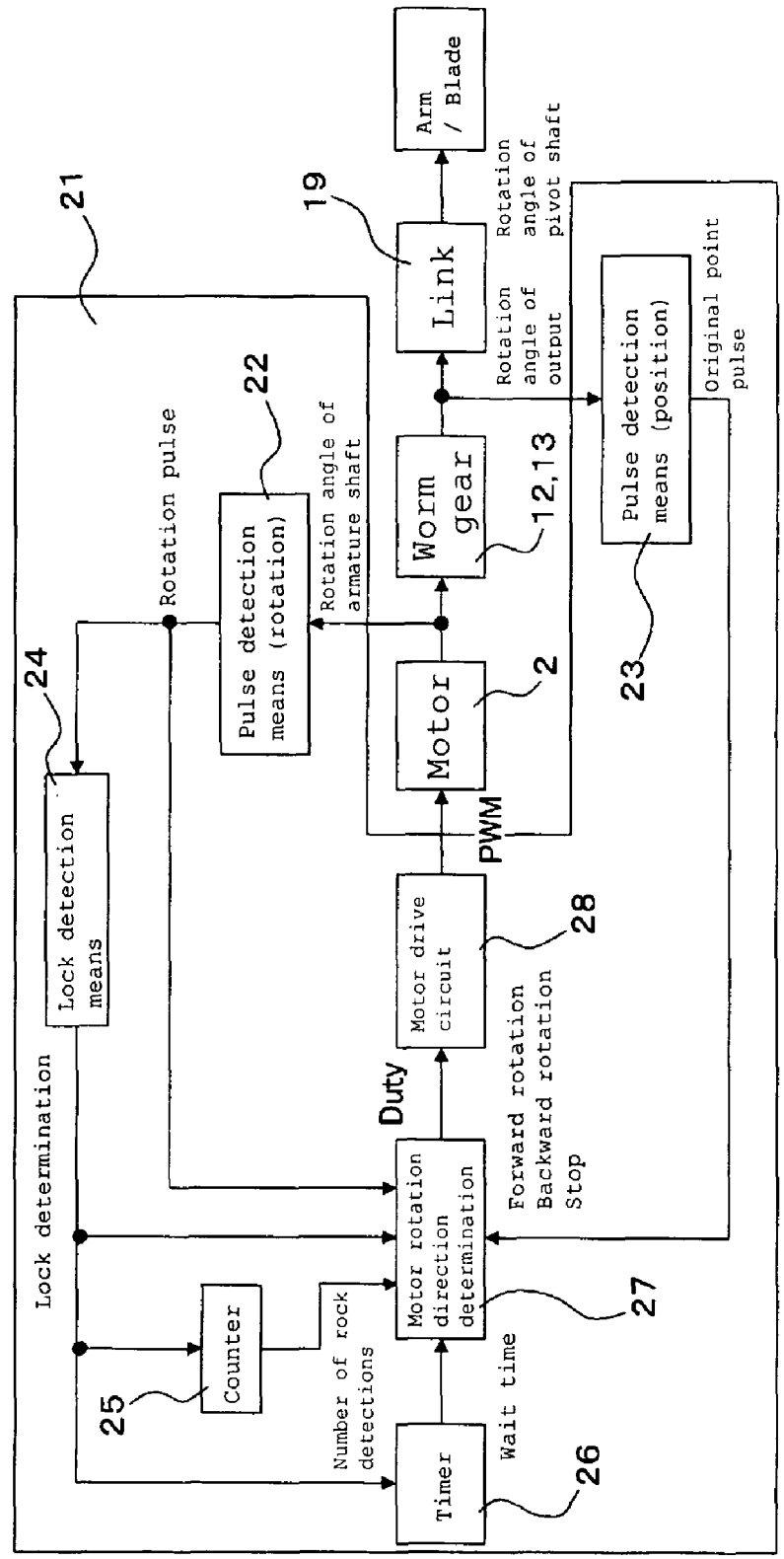

[FIG. 4]
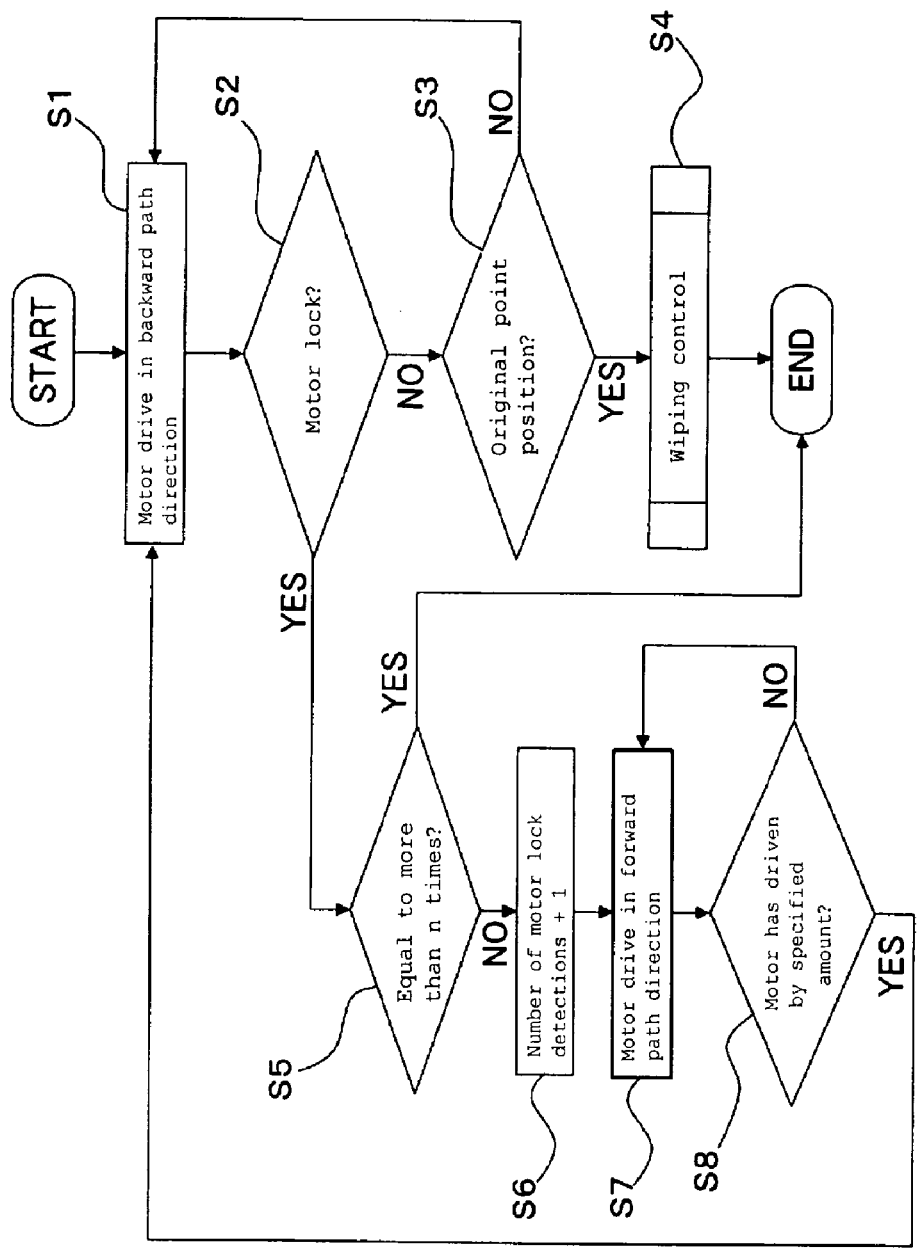

[FIG. 5]
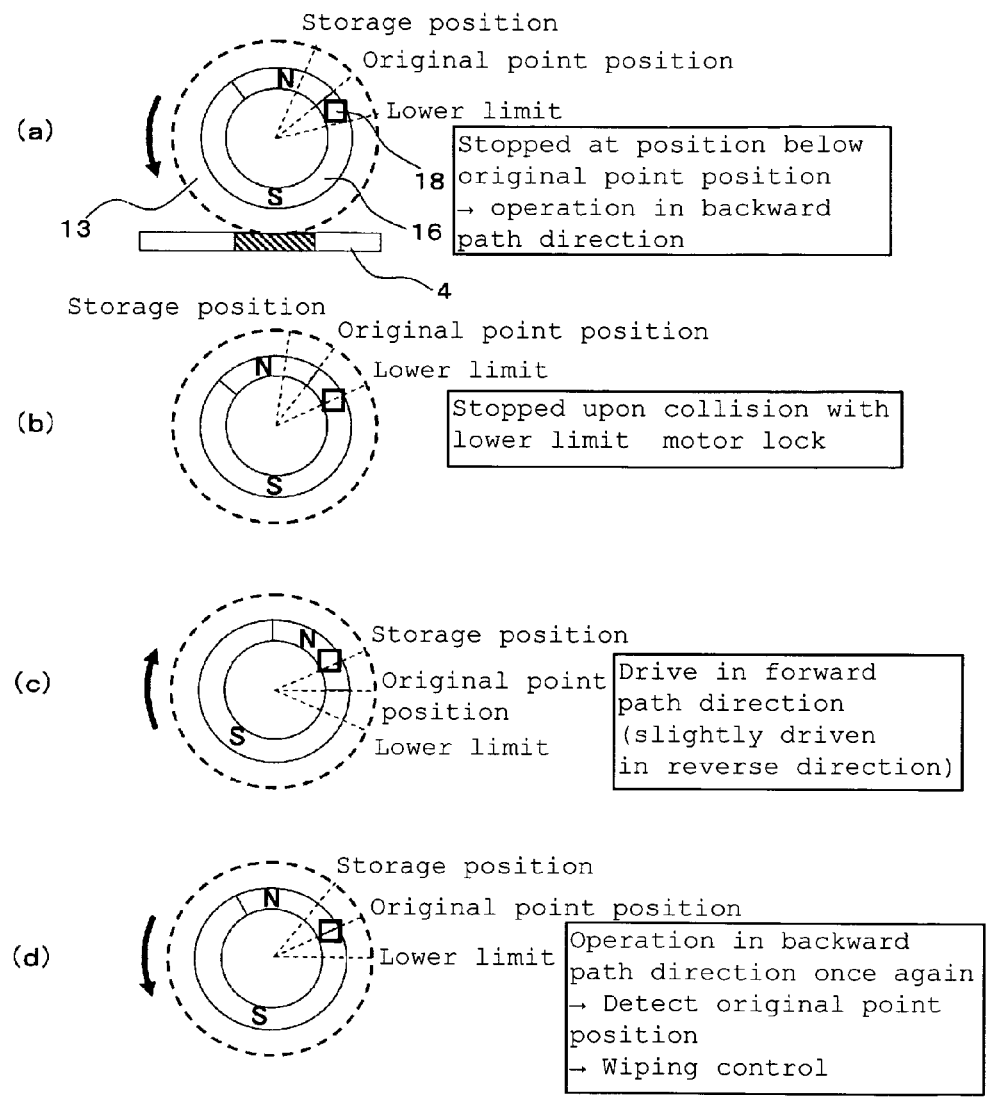

[FIG. 6]
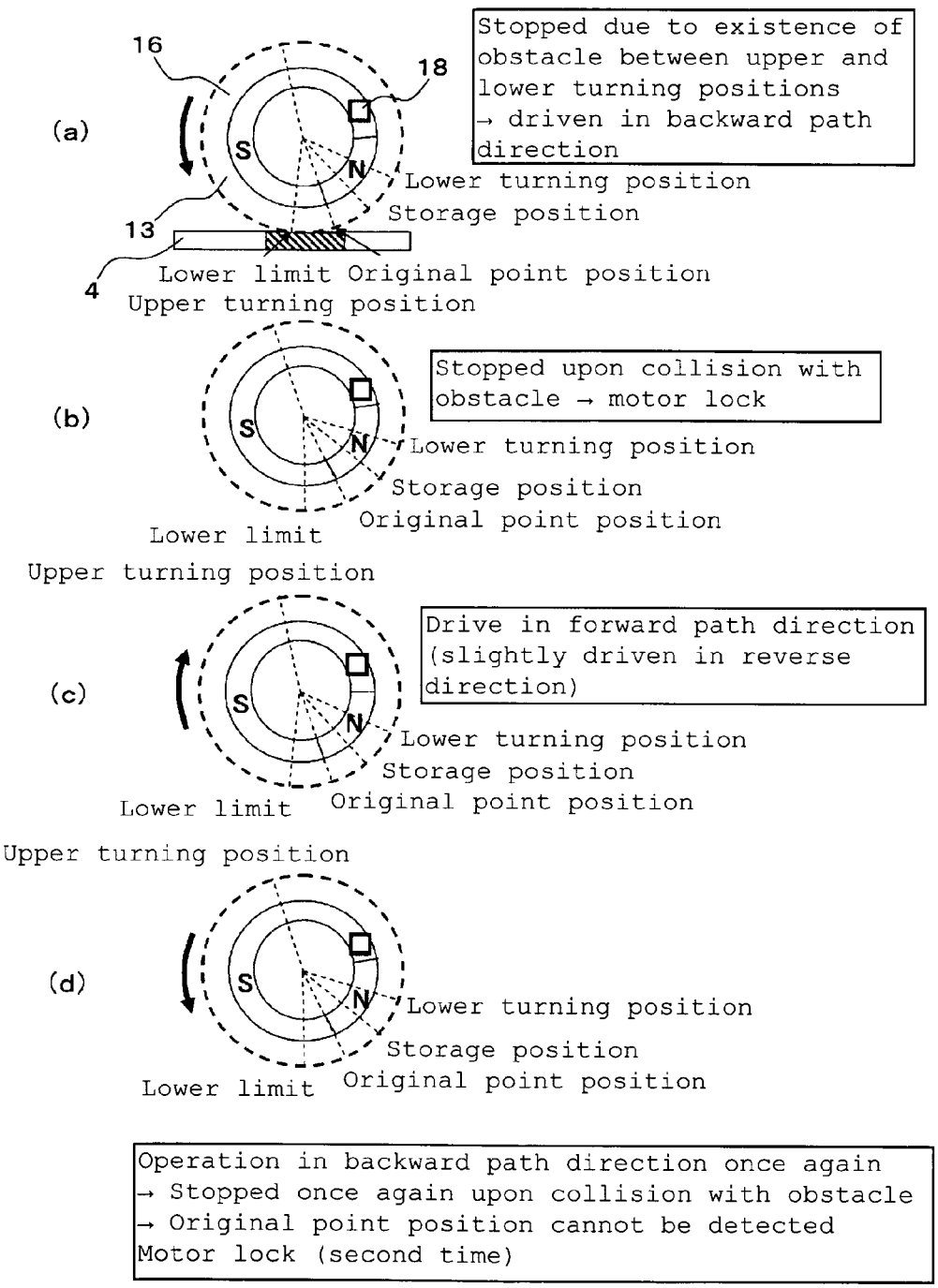

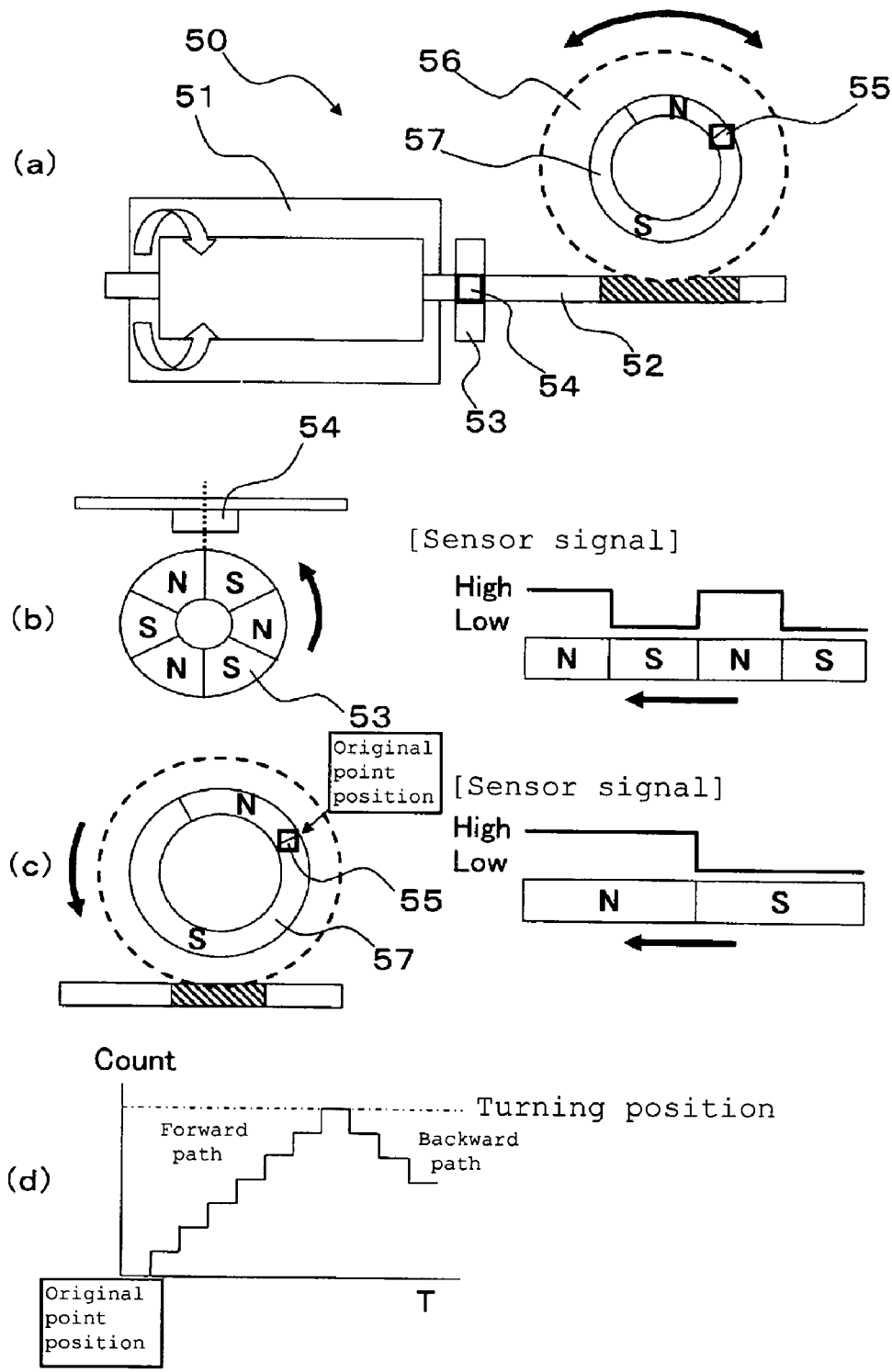
[FIG. 7]

[FIG. 8]
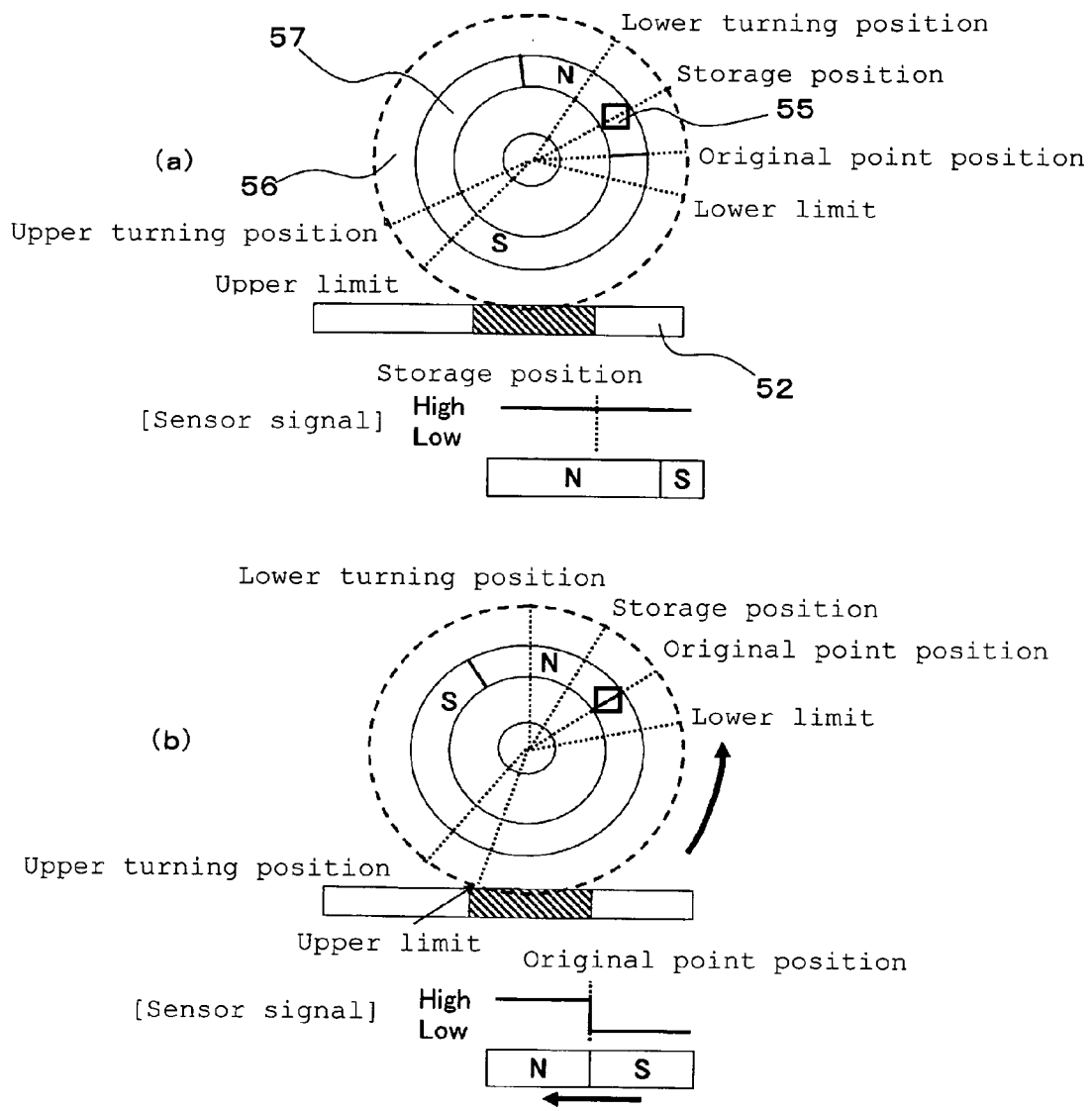

[FIG. 9]
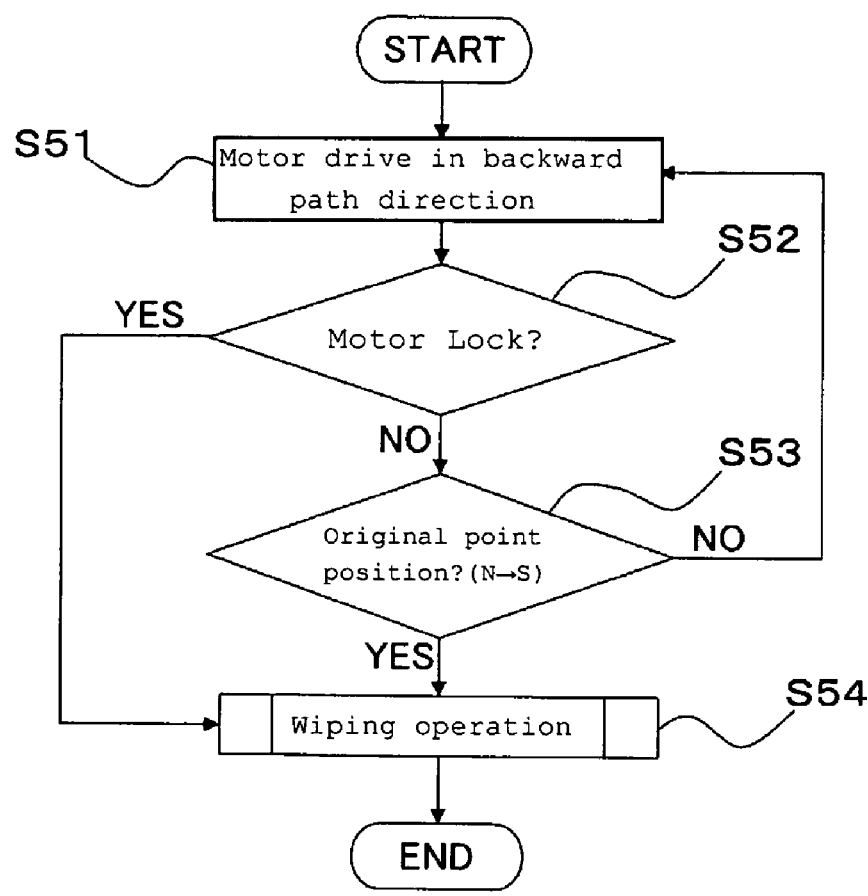

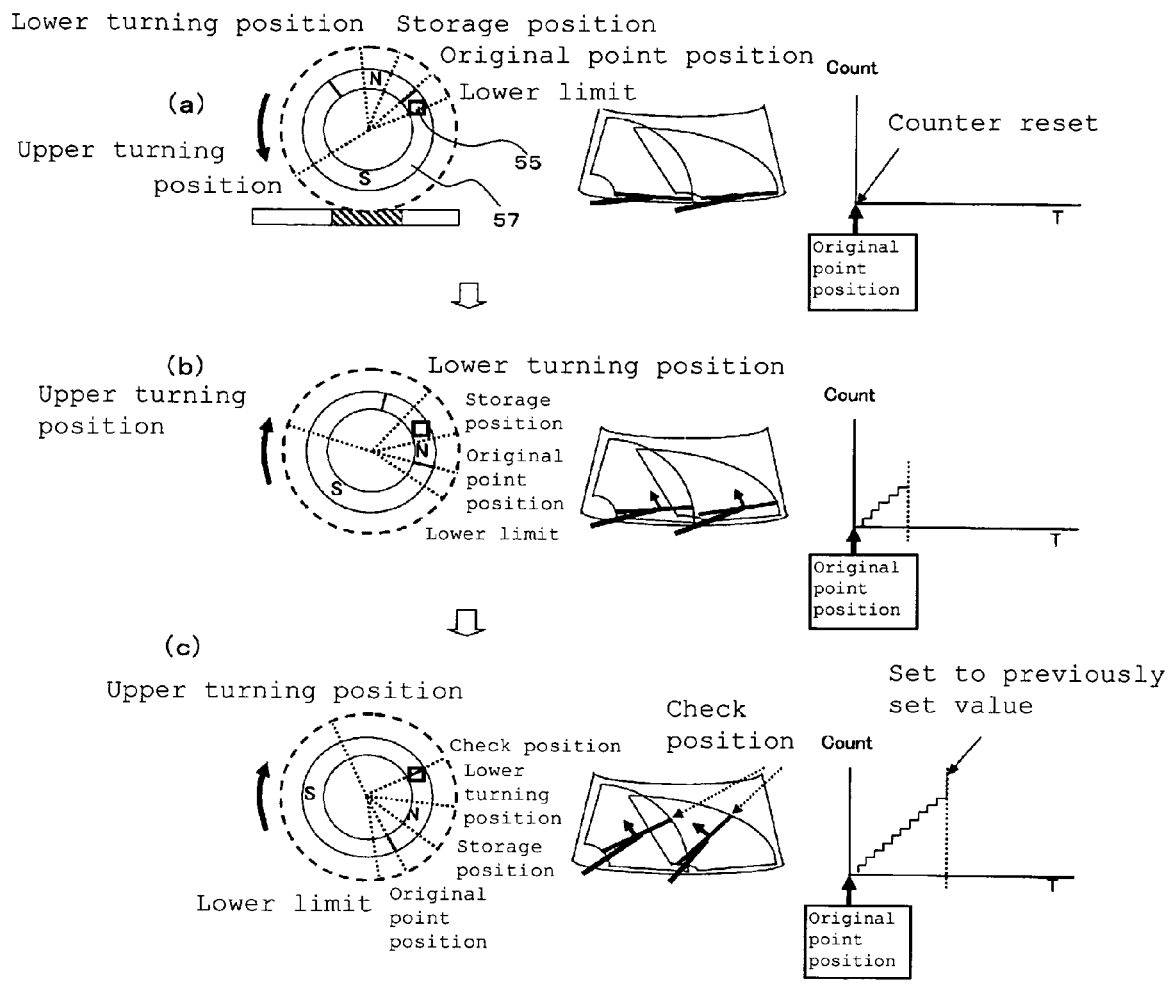

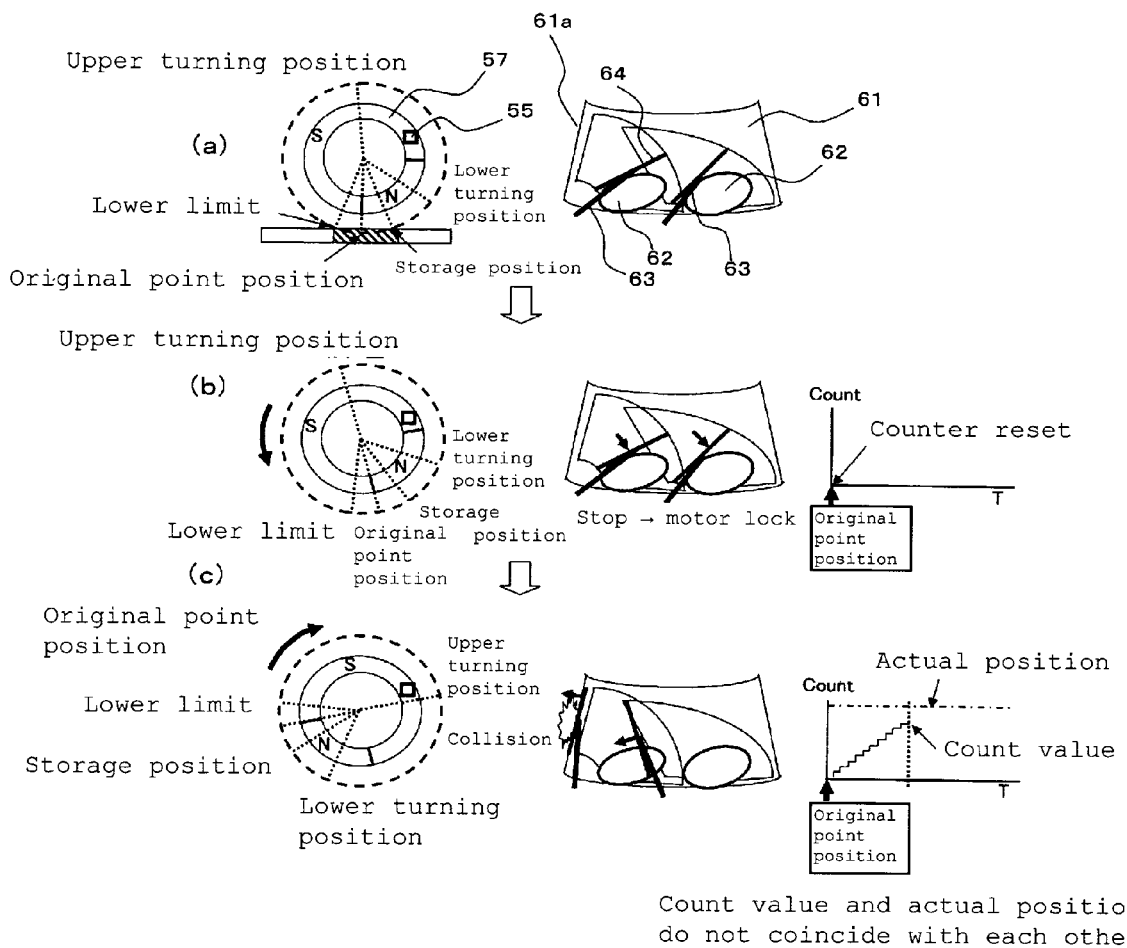

US 8,005,590 B2

WIPER CONTROL METHOD AND WIPER CONTROL SYSTEM

TECHNICAL FIELD

The present invention relates to a control technique for a wiper apparatus for vehicles such as a car and, more particularly, to a control method and a control system for a wiper apparatus using a forward/reverse drive motor as a drive source.

BACKGROUND ART

Conventionally, in a typical vehicle wiper apparatus, the rotation output of a motor rotating in a certain direction is converted into a reciprocating movement by means of a link unit so as to reciprocate a wiper arm (hereinafter, sometimes referred to merely as "arm") on a surface to be wiped (e.g., windshield). In recent years, along with a requirement to narrow down the attachment space of the wire apparatus, a system that drives a wiper arm by a forward/reverse rotation of the motor has been developed in order to reduce the movement area of the link unit to less than half that of a conventional link unit and has been adopted in many cars.

In a wiper system that forwardly and reversely rotates a motor, the movement area (working limitation) in the up-down direction is limited by a mechanical stop. On the other hand, the reciprocating movement of the arm is realized by switching the rotation direction of the motor at the timing when the arm reaches the upper and lower turning positions. Therefore, in controlling the motor drive control, it is necessary to detect whether the wiper arm has reached the turning positions in the motor drive control. To this end, the position and movement speed of the wiper arm need to be detected. For example, in a system described in Patent Documents 1 and 2, the position and the movement speed of the wiper arm are detected by means of a motor rotation pulse generated in association with the rotation of the motor.

FIG. 7 is an explanatory view showing the basic configuration of a motor unit 50 used in the wiper system that forwardly and reversely rotates a motor. As shown in FIGS. 7 (a) and 7 (b), in this wiper system, a multi-pole-magnetized magnet 53 having a plurality (e.g., six poles) of magnetic poles formed in the circumferential direction is fitted to a rotary shaft 52 of a motor 51. Further, a magnetic sensor 54 such as a Hall IC is arranged opposite to the multi-pole-magnetized magnet 53. When the motor is driven, the multi-pole-magnetized magnet 53 rotates with the rotary shaft 52 of the motor and the polarity of the magnetic pole located opposite to the magnetic sensor 54 changes accordingly. A sensor signal as shown in FIG. 7 (b) is output from the magnetic sensor 54 each time when the polarity changes and the output signal is input to a control unit so as to be used as a motor rotation pulse.

There exists a correlation based on the reduction ratio or link operation ratio between the rotation angle of the rotary shaft 52 and movement angle of the wiper arm, so that it is possible to calculate the movement amount of the arm from the rotation angle of the rotary shaft 52. Thus, the position of the wiper arm is detected by means of additions and subtractions of the number of motor rotation pulses. However, since there is a risk of pulse shift when relying only on motor rotation pulses, a magnetic sensor 55 serving as an absolute position detecting sensor is added to the wiper system and the pulse count is corrected by the output signal of the sensor. For example, a position detecting sensor is arranged near a storage position of the wiper arm and the pulse count is reset to a predetermined value when the output signal of the sensor is obtained in order to recognize the position of the wiper arm by the number of pulses counted from the absolute value.

As shown in FIG. 7 (a), in the wiper system, a ring magnet 57 is fitted to a worm wheel 56 engaged with the rotary shaft 52. The ring magnet 57 has two magnetic poles formed in the circumferential direction and rotates with the worm wheel 56. As shown in FIG. 7 (c), a sensor signal is output from the magnetic sensor 55 when the magnetic pole of the ring magnet 57 arranged opposite to the magnetic sensor 55 changes from N pole to S pole. Then, as shown in FIG. 7 (d), by counting the number of motor rotation pulses with the sensor signal output position set as the original point position, it is possible to detect the movement of the wiper arm from the original point position. With the pulse count corresponding to the turning positions previously calculated and set, the motor is reversely rotated when the pulse count reaches a predetermined value, whereby the wiper arm is reciprocated between the upper and lower turning positions.

In the normal operation of such a wiper system, the original point position is recognized in the first wiping operation activated in response to turn-on of a wiper switch. FIG. 8 is an explanatory view showing original point position recognition operation performed at the start-up time. In a switch-off state, the wiper arm is situated at the storage position, and the state of the ring magnet 57 at this time is as shown in FIG. 8 (a). That is, N pole of the ring magnet 57 faces the magnetic sensor 55, and the sensor signal thereof is in a High state. When the wiper switch is turned on in this state, the motor 51 drives in the backward path direction (direction from upper turning position toward lower turning position). Then, ring magnet 57 rotates leftward as shown in FIGS. 8 (a)→(b) and the original point position (boundary between N pole and S pole) reaches the position corresponding to the magnetic sensor 55. As a result, the sensor signal changes from High to Low state, whereby the original point position is recognized at the wiper start-up time.

However, when the wiper arm is stopped at a position below the original point at the wiper start-up time, the magnetic sensor 55 is situated in the S pole area. Thus, even though the motor is driven in the backward path direction, the N/S boundary does not face the magnetic sensor 55 during the abovementioned operation, with the result that it is impossible to recognize the original point position. Further, when the arm is situated at a position near the upper turning position of the wiping area, the magnetic sensor 55 is also situated in the S pole area. In this case, however, the original point position passes through a position corresponding to the magnetic sensor 55 by the abovementioned backward path movement at the start-up time, whereby the original point position can be recognized.

In order to cope with the above problem, when the arm is situated at a position below the original point position, the motor 51 is driven in the backward path direction and, then, the operation of the motor is controlled with the lower limit position at which the motor is locked set as a reference position. The control operation at the wiper start-up time is shown in a flowchart of FIG. 9. As shown in FIG. 9, when the wiper is turn on, the motor drives in the backward path direction as described above (step S51). The flow advances to step S52 where it is determined whether the motor 51 is in a locked state. In the case where the wiper arm is stopped at a position below the original point position (i.e., position between the original point position and lower limit position), the wiper arm reaches the lower limit position by the movement in the backward path direction and is then brought into contact with a mechanical stop. As a result, the motor 51 is in a locked state, and this locked state is detected in step S52.

The lower limit position is an absolute position that has previously been set. When the state where the wiper arm is situated at this position can be recognized, the current position of the wiper arm can be calculated by performing pulse count starting from the lower limit position as a reference. Thus, when it is determined in step S52 that the motor 51 in a locked state, the flow advances to step S54 where wiping control is performed based on the pulse count. However, also in this case, the pulse count is not performed starting from the proper original point position, so that it is necessary to correct a count value in course of the wiper arm operation. FIG. 10 is an explanatory view showing pulse count correction control after the motor lock.

As shown in FIG. 10 (*a*), when the motor 51 is in a locked state at the lower limit position by the movement in the backward path direction, the counter is once reset at the lower limit position as an original position. Afterward, as shown in FIG. 10 (*b*), the motor 51 is driven in the forward path direction (direction from lower turning position toward upper turning position) and, at the same time, pulse count control is started. Along with the movement of the arm, another N/S boundary of the ring magnet 57 reaches the magnetic sensor 55. This N/S boundary also faces the magnetic sensor 55 at the time when the wiper arm reaches a predetermined position. In this system, therefore, the predetermined position is used as a check position and, as shown in FIG. 10 (*c*), when a signal indicating that the magnetic sensor 55 faces the check position is obtained, the pulse count value is corrected to a previously set value. Thus, even in the case where the arm position is recognized by a motor locked state, normal pulse count control can be restored by the correction based on the check position.

On the other hand, when it is determined in step S52 that the motor 51 is not in a locked state, the flow advances to step S53 where it is determined whether the original point position has passed the magnetic sensor 55 (i.e., whether the magnetic pole is changed from N pole to S pole). When the original point position has not passed, the flow returns to step S51 where the movement in the backward path direction is continued to repeat the processing of steps S52 and S53. When the wiper arm is stopped at a position above the original point position, the original point position reaches the magnetic sensor 55, and it is detected in step S53 that the original point position has passed the magnetic sensor 55. In this case, it is determined that the wiper arm reaches the original point position, the backward movement is then stopped, and the flow advances to step S54. In step S54, wiping control is performed using the pulse count based on the original point position, whereby the wiper arm is reciprocated to perform wiping operation between the upper and lower turning positions.

Patent Document 1: Jpn. Pat. Appln. Laid-Open Publication No. 11-301409

Patent Document 2: Jpn. Pat. Appln. Laid-Open Publication No. 2004-274804

However, in such a wiper system, when an obstacle 62 such as snow exists on a windshield 61 as shown in FIG. 11 (*a*) and a wiper arm 63 is stopped in the middle of the wiping operation, the following problem arises. When the wiper switch (or ignition switch) is turned off in the state shown in FIG. 11 (*a*), the arm position information (pulse count value) obtained up to this time is reset. Therefore, at the wiper restart time, the processing shown in FIG. 9 is executed so as to recognize the original point position and the like (original point position and arm current position detected based on the contact state to the lower limit position when the arm is stopped at a position below the original point) of the wiper arm 63.

In this case, if there is no obstacle 62 and the wiper arm 63 can freely move in the backward path direction, the original position and the like of the arm is recognized by the control operation shown in FIG. 9 at the start-up time and normal pulse count control can be restored without problems. However, as shown in FIG. 11 (*b*), when the obstacle 62 interferes with the return of the wiper arm 63, it is determined in the processing of FIG. 9 that the motor is locked at this moment and, accordingly, the flow advances from step S52 to step S54. In particular, in the case where the arm is stopped in the S pole area above the check position, there is no chance of detecting the arm position other than the arm lock state. Thus, the lock state caused due to the existence of the obstacle is determined as the arm lock state in step S52. That is, the stop of the wiper arm 63 due to existence of the obstacle 62 may falsely be recognized as the stop of the wiper arm 63 at its lower limit position and, in this case, the pulse count control is started at the falsely recognized stop position.

When the pulse count control is started based on the motor lock caused due to the obstacle 62, the wiping control is executed in a state where the pulse count value and actual arm position do not coincide with each other. Thus, even though the wiper arm 63 actually reaches the upper turning position, it is recognized that the wiper arm 63 is in the middle of the forward path in the control, so that the wiper arm 63 is not stopped. Accordingly, the wiper arm 63 continues moving in the forward path direction with the result that, as shown in FIG. 11 (*c*), a wiper blade 64 may overrun and collide with an end portion 61*a* (A-pillar) of the windshield 61. When the wiper blade 64 overruns as described above, the wiper blade may be broken, or windshield 61 or A-pillar may be damaged. Thus, when the wiper is caused to operate in a state where the pulse count value and actual arm position do not coincide with each other as described above, the arm movement cannot appropriately be controlled.

An object of the present invention is to prevent a wiper apparatus from falsely operating in restart time even after occurrence of a problem in which snow or the like interfere with the movement of the wiper arm.

Summary of the Invention

According to the present invention, there is provided a wiper control method for driving a motor to rotate forwardly and reversely so as to reciprocate a wiper arm for a wiping operation and controlling the operation of the wiper arm according to an absolute position signal output when the wiper arm is located at a predetermined position and a relative position signal output in association with the rotation of the motor. The wiper arm is moved in a predefined first direction at the start-up time of the wiper arm, and in the case where the motor is in a locked state before the absolute position signal is output, reciprocation operation in which the wiper arm is once moved in a second direction opposite to the first direction and then the wiper arm is moved in the first direction once again is executed.

In the wiper control method according to the present invention, the wiper arm is first moved in the first direction. In the case where the motor is in a locked state before the absolute position signal is output, reciprocation operation is executed to move the wiper arm in the second direction first and then in the first direction. Thus, in the case where, for example, the original point position at which the absolute position signal is output and lower limit position at which the movement of the wiper arm is mechanically restricted are provided below the lower turning position of the wiper arm, when the wiper arm is started up in a state where the arm is stopped below the original point position, the wiper reaches the lower limit position before the absolute position signal is output to cause the motor to be in a locked state, whereby the reciprocation operation can be performed. In this case, by making a setting such that the arm passes through the original point position during the reciprocation operation, it is possible to reliably recognize the original point position at the start-up time even if the arm is located below the original point position. Also, in the case where there is an obstacle such as snow between the upper and lower turning positions of the wiper arm and the obstacle interferes with the movement of the wiper arm, the arm is stopped at the start-up time by the obstacle before the absolute position signal is output to cause the motor to be in a locked state and, then, the reciprocation operation is executed. In this case, in the case where the absolute position signal has not yet been output even after a plurality of number of times of the reciprocation operations and therefore the original point position cannot be recognized, the motor is not forced to operate furthermore but is stopped, thereby preventing occurrence of a malfunction of the arm due to false recognition.

In the wiper control method, in the case where the absolute position signal has not yet been output even after the execution of the reciprocation operation, the reciprocation operation may be executed once again. In the case where the absolute position signal has not yet been output even after the execution of the reciprocation operation, the reciprocation operation may be executed by a predetermined number of times. In the case where the absolute position signal has not yet been output even after a plurality of number of times of the reciprocation operations, the motor may be stopped.

In the wiper control method, the wiper apparatus may have: upper and lower turning positions at which movement direction of the wiper arm is reversed; upper and lower limit positions which are arranged beyond the upper and lower turning positions respectively and at which the movement of the wiper arm is mechanically restricted; and an original point position which is arranged between the lower limit position and lower turning position and at which the absolute position signal is output. Further, as the first direction, the direction in which the wiper arm approaches the lower limit position may be set.

Further, according to the present invention, there is provided a wiper control system characterized by comprising: a motor that can rotate forwardly and reversely; a wiper arm driven by the motor; a first sensor means for outputting an absolute position signal when the wiper arm is located at a predetermined position; a second sensor means for outputting a relative position signal in association with the rotation of the motor; a relative position signal detection means for detecting the relative position signal; a lock detection means for detecting presence or absence of occurrence of a locked state of the motor based on the relative position signal; a motor rotation direction determination means for setting the rotation direction of the motor; and a motor drive means for rotating the motor in a predetermined direction based on an instruction from the motor rotation direction determination means. The motor rotation direction determination means rotates the motor in a predefined first direction at the start-up time of the wiper arm. In the case where the motor is in a locked state before the absolute position signal is output, the motor rotation direction determination means executes reciprocation operation of rotating the motor in a second direction opposite to the first direction by a predetermined number of rotations or predetermined time period and then rotates the motor in the first direction once again.

In the wiper control system according to the present invention, the motor rotation direction determination means first moves the wiper arm in the first direction. In the case where the motor is in a locked state before the absolute position is output, the motor rotation direction determination means executes reciprocation operation to move the wiper arm in the second direction first and then in the first direction. Thus, in the case where, for example, the original point position at which the absolute position signal is output and lower limit position at which the movement of the wiper arm is mechanically restricted are provided below the lower turning position of the wiper arm, when the wiper arm is started up in a state where the arm is stopped below the original point position, the wiper reaches the lower limit position before the absolute position signal is output to cause the motor to be in a locked state, whereby the reciprocation operation can be performed. In this case, by making a setting such that the arm passes through the original point position during the reciprocation operation, it is possible to reliably recognize the original point position at the start-up time even if the arm is located below the original point position. Also, in the case where there is an obstacle such as snow between the upper and lower turning positions of the wiper arm and the obstacle interferes with the movement of the wiper arm, the arm is stopped at the start-up time by the obstacle before the absolute position signal is output to cause the motor to be in a locked state and, then, the reciprocation operation is executed. In this case, in the case where the absolute position signal has not yet been output even after a plurality of number of times of the reciprocation operations and therefore the original point position cannot be recognized, the motor is not forced to operate furthermore but is stopped, thereby preventing occurrence of a malfunction of the arm due to false recognition.

In the wiper control system, in the case where the absolute position signal has not yet been output even after the execution of the reciprocation operation, the motor rotation direction determination means may execute the reciprocation operation once again. In the case where the absolute position signal has not yet been output even after the execution of the reciprocation operation, the motor rotation direction determination means may execute the reciprocation operation by a predetermined number of times. In the case where the absolute position signal has not yet been output even after the reciprocation operation is executed by a predetermined number of times, the motor rotation direction determination means may stop the motor. Further, the wiper control system may include a counter for counting the number of executions of the reciprocation operation or a timer for controlling the reverse rotation time in the reciprocation operation.

According to the wiper control method of the present invention, in a wiper apparatus for driving a motor to rotate forwardly and reversely so as to reciprocate a wiper arm for a wiping operation and controlling the operation of the wiper arm according to an absolute position signal output when the wiper arm is located at a predetermined position and a relative position signal output in association with the rotation of the motor, the wiper arm is moved in a predefined first direction at the start-up time of the wiper arm. In the case where the motor is in a locked state before the absolute position signal is output, reciprocation operation in which the wiper arm is once moved in a second direction opposite to the first direction and then the wiper arm is moved in the first direction once again is executed. Thus, in the case where the control method according to the present invention is applied to a wiper apparatus in which, for example, the original point position at which the absolute position signal is output and lower limit position at which the movement of the wiper arm is mechanically restricted are provided below the lower turning position of the wiper arm, when the wiper arm is started up in a state where the arm is stopped below the original point position, the wiper reaches the lower limit position before the absolute position signal is output to cause the motor to be in a locked state, whereby the reciprocation operation can be performed. In this case, by making a setting such that the arm passes through the original point position during the reciprocation operation, it is possible to reliably recognize the original point position at the start-up time even if the arm is located below the original point position.

Further, according to the wiper control method of the present invention, also in the case where there is an obstacle such as snow between the upper and lower turning positions of the wiper arm and the obstacle interferes with the movement of the wiper arm, the arm is stopped at the start-up time by the obstacle before the absolute position signal is output to cause the motor to be in a locked state and, then, the reciprocation operation is executed. In this case, in the case where the absolute position signal has not yet been output even after a plurality of number of times of the reciprocation operations and therefore the original point position cannot be recognized, the motor is not forced to operate furthermore but is stopped. As a result, it is possible to prevent wiping control from being executed in a false recognition state where the pulse count value and actual arm position do not coincide with each other, thereby preventing overrun of the wiper arm at the upper turning position. Therefore, it is possible to prevent a wiper blade or car body from being damaged due to the overrun, thereby increasing reliability of the operation of the wiper apparatus.

The wiper control system of the present invention includes a motor that can rotate forwardly and reversely; a wiper arm driven by the motor; a first sensor means for outputting an absolute position signal when the wiper arm is located at a predetermined position; a second sensor means for outputting a relative position signal in association with the rotation of the motor; a relative position signal detection means for detecting the relative position signal; a lock detection means for detecting presence or absence of occurrence of a locked state of the motor based on the relative position signal; a motor rotation direction determination means for setting the rotation direction of the motor; and a motor drive means for rotating the motor in a predetermined direction based on an instruction from the motor rotation direction determination means. The motor rotation direction determination means first moves the wiper arm in the predefined first direction at the start-up time of the wiper arm. In the case where the motor is in a locked state before the absolute position signal is output, the motor rotation direction determination means executes reciprocation operation in which the wiper arm is once moved in the second direction opposite to the first direction and then the wiper arm is moved in the first direction. Thus, in the case of the wiper apparatus in which, for example, the original point position at which the absolute position signal is output and lower limit position at which the movement of the wiper arm is mechanically restricted are provided below the lower turning position of the wiper arm, when the wiper apparatus is started up in a state where the arm is stopped below the original point position, the arm reaches the lower limit position before the absolute position signal is output to cause the motor to be in a locked state, whereby the reciprocation operation can be performed. In this case, by making a setting such that the arm passes through the original point position during the reciprocation operation, it is possible to reliably recognize the original point position at the start-up time even if the arm is located below the original point position.

Further, according to the wiper control system of the present invention, also in the case where there is an obstacle such as snow between the upper and lower turning positions of the wiper arm and the obstacle interferes with the movement of the wiper arm, the arm is stopped at the start-up time by the obstacle before the absolute position signal is output to cause the motor to be in a locked state and, then, the reciprocation operation is executed. In this case, in the case where the absolute position signal has not yet been output even after a plurality of number of times of the reciprocation operations and therefore the original point position cannot be recognized, the motor is not forced to operate furthermore but is stopped. As a result, it is possible to prevent wiping control from being executed in a false recognition state where the pulse count value and actual arm position do not coincide with each other, thereby preventing overrun of the wiper arm at the upper turning position. Therefore, it is possible to prevent a wiper blade or car body from being damaged due to the overrun, thereby increasing reliability of the operation of the wiper apparatus.

BRIEF DESCRIPTION OF THE DRAWINGS

FIG. 1 is an explanatory view showing a configuration of a motor unit used in a wiper control system which is an embodiment of the present invention;

FIG. 2 is an explanatory view showing the movement range of a wiper arm;

FIG. 3 is a block diagram showing a configuration of the wiper control system which is an embodiment of the present invention;

FIG. 4 is a flowchart showing a processing procedure of a wiper control method which is an embodiment of the present invention;

FIGS. 5a-5d are explanatory views showing the positional relationship between a ring magnet and Hall IC in a control scheme taken when the wiper arm is stopped at a position below the original position;

FIGS. 6a-6d are explanatory views showing the positional relationship between the ring magnet and Hall IC in a control scheme taken when the wiper arm is stopped by an obstacle;

FIGS. 7a-7d are explanatory views showing the basic configuration of the motor unit used in the wiper system that forwardly and reversely rotates a motor;

FIGS. 8a-8b are explanatory views showing original point position recognition operation performed at start-up time in a conventional wiper system;

FIG. 9 is a flowchart showing control processing performed at start-up time in a conventional wiper system;

FIGS. 10a-10c are explanatory views showing pulse count correction control after motor lock; and FIGS. 11a-11c are explanatory views showing a control state at restart time after an obstacle existing on a windshield stops the movement of the wiper arm in the middle of its wiping operation.

EXPLANATION OF REFERENCE NUMERALS

1: Motor unit
2: Motor
3: Gear box
4: Rotary shaft
5: Output shaft
6: Yoke

7: Armature core
8: Commutator
9: Permanent magnet
10: Brush
11: Case frame
12: Worm
13: Worm wheel
14: Multi-pole-magnetized magnet
15: Hall IC
16: Ring magnet
17: Printed circuit board
18: Hall IC
19: Link mechanism
21: Wiper control apparatus
22: Pulse detection means
23: Pulse detection means
24: Lock detection means
25: Counter
26: Timer
27: Motor rotation direction determination means
28: Motor drive circuit
50: Motor unit
51: Motor
52: Rotary shaft
53: Multi-pole-magnetized magnet
54: Magnetic sensor
55: Magnetic sensor
56: Worm wheel
57: Ring magnet
61: Windshield
61a: End portion
62: Wiper arm
63: Wiper arm
64: Wiper blade

DETAILED DESCRIPTION OF THE INVENTION

Embodiments of the present invention will be described in greater detail with reference to the accompanying drawings. FIG. 1 is an explanatory view showing a configuration of a motor unit used in a wiper control system which is an embodiment of the present invention. Like the motor unit 50 shown in FIG. 7, a motor unit 1 of FIG. 1 includes a motor 2 and a gear box 3. The rotation of the rotary shaft 4 of the motor 2 is reduced in speed in the gear box 3 and is output to an output shaft 5. The rotary shaft 4 is rotatably supported by a bottomed cylindrical yoke 6, and an armature core 7, around which a coil is wound, and a commutator 8 are fitted to the rotary shaft 4. A plurality of permanent magnets 9 are fixed to the inner surface of the yoke 6. A feeding brush 10 is slidably held in contact with the commutator 8. The rotary speed (the number of rotations) of the motor 2 is controlled by the flow rate of the electric current supplied to the brush 10.

The gear box 3 has a case frame 11 that is fitted to the edge of the open end of the yoke 6. Note that FIG. 1 shows a state where a cover of the case frame 11 is removed. The leading end portion of the rotary shaft 4 projects out from the yoke 6 and contained in the case frame 11. A worm 12 is formed at the leading end portion of the rotary shaft 4 and engaged with a worm wheel 13. The worm wheel 13 is fixed to the output shaft and rotatably supported by the case frame 11. The drive power of the motor 2 is output to the output shaft 5 in a reduced velocity condition by way of the worm 12 and worm wheel 13.

A multi-pole-magnetized magnet 14 (to be referred to simply as magnet 14 hereinafter) is fitted to the rotary shaft 4. On the other hand, a Hall IC 15 is arranged opposite to the outer periphery of the magnet 14 in the case frame 11. The Hall IC 15 corresponds to the magnetic sensor 54 of FIG. 7 (a). When the rotary shaft 4 makes a full turn, a pulse signal corresponding to six periods is output from the Hall IC 15 as a motor rotation pulse. It is possible to detect the rotation speed of the rotary shaft 4 from the period of the motor rotation pulse. The number of rotations of the rotary shaft 4 and the moving speed of the arm show a correlation that is based on the reduction ratio and the link operation ratio, so that it is also possible to calculate the moving speed of the wiper arm from the detected number of rotations of the rotary shaft 4.

A ring magnet 16 for detecting the absolute position of the arm is fitted to the worm wheel 13. The ring magnet 16 has two poles magnetized in the circumferential direction. A printed circuit board 17 (denoted by the dot-and-dash line in FIG. 1) is fitted to the case frame 11 and a Hall IC 18 is arranged opposite to the ring magnet 16 on the printed circuit board 17. Like the Hall IC 18, the abovementioned Hall IC 15 is also arranged on the printed circuit board 17. The worm wheel 13 is configured to rotate by about 180° to reciprocate the wiper arm. As the worm wheel 13 rotates and the arm reaches a predefined original point position, the Hall IC 18 faces the magnetic pole boundary (between N pole and S pole) of the ring magnet 16 and then an absolute position signal is output to indicate the current position of the arm.

The wiper arm is driven by the motor unit 1 having the configuration described above to swing between the upper turning position and the lower turning position to remove the rain drops or the snow flakes adhering to the windshield of a vehicle. FIG. 2 is an explanatory view showing the movement range of a wiper arm. During the wiping operation, the arm reciprocates in the wiping range between the upper turning position and the lower turning position indicated by hatching lines in FIG. 2. When the wiper is at rest, the arm is moved to a storage position located below the lower turning position of the arm and stored in a storage section. The storage section is arranged in the inside of the hood of the vehicle (not shown). An upper limit position and a lower limit position are provided for the arm respectively outside the upper and lower turning positions. The upper and lower limit positions are defined by mechanical restriction means arranged in the motor unit 1. For example, a link member (not shown) fitted to the output shaft 5 is brought into contact with the restriction means to thereby define the upper and lower limit positions.

As in the case of the conventional system shown in FIGS. 7 to 10, an original point position, at which the absolute position signal is output from the Hall IC 18, is set between the storage position and lower limit position. As described above, also in the system, the arm is caused to operate once in the backward path direction at the start-up time so as to detect the original point position, and the motor rotation pulse is counted based on the detected original point position. This allows the current position of the wiper arm to be detected, and by forwardly and reversely driving the motor 2 at the upper and lower turning position, the wiper arm can reciprocate in the wiping range.

In the conventional method for recognizing the original point position, when there is an obstacle on the windshield as shown in FIG. 11 (a), a malfunction may occur at restart time after the stop. In order to cope with the problem, in a wiper apparatus control method according to the present invention, an obstacle detection function is imparted to the original point position recognition operation at the start-up time. That is, when there is an obstacle, the wiping operation is stopped to prevent the wiper blade from being damaged. FIG. 3 is a block diagram showing an entire configuration of the wiper control system which is an embodiment of the present invention. A wiper control method according to the present invention is achieved by the system shown in FIG. 3.

As shown in FIG. 3, the drive of the motor 2 is controlled by a wiper control unit 21, and the rotation of the motor 2 is output to the output shaft 5 by way of the worm 12 and worm wheel 13. The output shaft 5 is connected to a link mechanism 19 of the wiper apparatus. When the motor 2 is driven, the link mechanism 19 is activated through the output shaft 5 to cause the wiper blade and wiper arm to operate. The Hall ICs 15 and 18 arranged in the motor unit 1 are connected respectively to pulse detection means 22 and 23. The pulse detection means 22 (relative position signal detection means) detects the motor rotation pulse output from the Hall IC 15, and the pulse detection means 23 detects an absolute position signal output from the Hall IC 18.

A lock detection means 24 is provided in the rear stage of the pulse detection means 22. The lock detection means 24 monitors the state of the motor 2 based on the period of the motor rotation pulse and determines that a motor lock has occurred when the pulse period becomes greater than a certain value. The lock detection means 24 is connected to a counter 25 and a timer 26 so as to detect the number of lock detections, elapsed time, and the like. The lock detection means 24 is further connected to the motor rotation direction determination means 27. The motor rotation direction determination means 27 is also connected to the pulse detection means 23 so as to determine the rotation direction (wiper arm movement direction) of the motor 2 based on the absolute position signal and motor rotation pulse.

The motor rotation direction determination means 27 outputs a signal representing the motor rotation direction and rotation speed based on the motor rotation pulse or absolute position signal while considering the presence or absence of the motor lock or number of lock detections. This signal is sent from the motor rotation direction determination means 27 to a motor drive circuit (motor drive means) 28. In the wiper system according to the present invention, a PWM control (Pulse Width Modulation) in which drive of the motor 2 is controlled by changing ON/OFF ratio of the pulse width of voltage to be applied to the motor 2 is executed. In performing the PWN control, the motor rotation direction determination means 27 sets the duty ratio of ON-period of a pulse voltage and transmits a control signal to the motor drive circuit 28. Upon reception of the control signal, the motor drive circuit 28 applies a pulse voltage corresponding to the set duty ratio to the motor 2. As a result, the motor 2 is feed-back controlled based on the motor rotation pulse or absolute position signal.

A wiper control method according to the present invention will next be described. FIG. 4 is a flowchart showing its processing procedure. When the wiper switch is turned on, the motor 2 drives in the backward path direction (step S1). The flow advances to step S2 where the lock detection means 24 determines whether the motor 2 is in a locked state. When the motor 2 is not in a locked state in step S2, the flow advances to step S3 where it is determined whether the original point position has passed (i.e., whether the magnetic pole is changed from N pole to S pole). When the original point position has not passed, the flow returns to step S1 where the movement in the backward path direction is continued to repeat the processing of steps S2 and S3. At this time, when the wiper arm is normally stopped at the storage position (above the original point position), the original point position (N/S boundary) will reach the Hall IC 18. That is, in the case where the arm is stopped at a position above the original point position and there is no obstacle, the arm inevitably passes the original point position by the backward path direction, whereby the original point position can be recognized.

After the passing of the original point position (change of magnet pole from N pole to S pole) has been detected and the original point position has been recognized in step S3, the flow advances to step S4 where wiping control is executed using the pulse count based on the original point position and, afterward, the flow exits the routine. In the wiping control in step S4, the motor rotation pulse is counted with the sensor signal output position of the Hall IC 18 as the original point and thereby the current position of the wiper arm is detected. The numbers of pulse counts corresponding to the upper and lower turning positions are previously calculated and set. When the pulse count reaches a predetermined value, the motor 2 is reversely rotated, whereby the wiper arm reciprocates between the upper and lower turning positions.

On the other hand, when the motor 2 is in a locked state in step S2, the flow advances to step S5 where the number of motor lock detections is checked. In the case where the number of motor lock detections is less than n (e.g., 6), the flow advances to step S6 where the number of motor lock detections of the counter 25 is incremented by 1, and the motor is then driven in the forward path direction in step S7. Subsequently, the motor 2 is driven in the forward path direction and it is confirmed whether the motor 2 has driven by a specified amount in step 8, that is, the motor 2 is driven in the forward path direction until the operation amount reaches a specified operation amount (steps S7, S8). At this time, the rotation direction of the motor 2 is detected by the motor rotation direction determination means 27, and motor drive amount is determined based on the number of pulse counts of the motor rotation pulses. After the motor 2 has driven by a specified amount in the forward path direction in step S8, the flow returns to step S1 where the motor 2 is driven in the backward path direction.

At this time, in the case where the wiper arm is stopped at a position below the original point position, the following operation is taken. FIG. 5 is an explanatory view showing the positional relationship between the ring magnet 16 and Hall IC 18 in a control scheme taken when the wiper arm is stopped at a position below the original position. In this case, the processing sequence "S1→S2→S3→S1" of FIG. 4 is repeated until the wiper arm reaches the lower limit position (FIG. 5 (a)). When the arm reaches the lower limit position and is brought into contact with a mechanical stop, the motor 2 is locked (FIG. 5 (b)), and the flow advances from steps S2 to S5. Since this is the first lock detection, the flow advances from step S5 to step S6 where 1 is incremented to 0 of the lock count (0+1=1), and then the flow advances to step S7.

In step S7, the motor 2 is slightly driven in the forward path direction and, accordingly, the ring magnet 16 passes through the original point position and reaches a position short of the storage position (FIG. 5 (c)). That is, as the specified amount in step S8, a value exceeding the distance between the lower limit position and original point position is set here. After the motor 2 has been driven in the forward path direction by the specified amount in step S8, the motor 2 is driven in the backward path direction once again in step S1. Then, as shown in FIG. 5 (d), the original point position moves from N pole to S pole while passing through the Hall IC 18, and then the sensor signal switches from High to Low. As a result, the original point position is recognized without occurrence of a motor lock. Then, the flow advances from step S1, S2, S3, up to S4 where the wiping control is executed using the pulse count based on the original point position, and the flow exits the routine.

In the conventional control scheme shown in FIG. 9, it is believed that the absolute position of the wiper arm can be recognized by the stop at the lower limit position even in the case where the wiper arm is stopped at a position below the original point position. Therefore, in the conventional system, pulse count control is executed based on the lower limit position, and the pulse count value is corrected at the check position. On the other hand, in the control scheme shown in FIG. 4, the motor 2 is driven in the forward path direction after the motor lock by a mechanical stop to cause the Hall IC 18 to once pass through the original point position and move once again in the backward path direction for recognition of the original point position. This operation eliminates the need to perform correction of the pulse count value at the check position. Further, this eliminates a section (e.g., a section between the lower limit position and check position) in which the actual position and pulse count value may differ from each other, thereby increasing control accuracy. Furthermore, only the sensor signal output at the time of the change of the magnetic pole from N pole to S pole can be used as an absolute position signal while the sensor signal at the time of the change of the magnetic pole from S pole to N pole is not used particularly in the control, which simplifies the control scheme to thereby reduce a burden on the control unit.

In the case where the movement of the arm is stopped by an obstacle or the like as shown in FIG. 11, the following control scheme is taken. FIG. 6 is an explanatory view showing the positional relationship between the ring magnet 16 and Hall IC 18 in a control scheme taken when the wiper arm is stopped by an obstacle. In the case of the conventional system, when the wiper arm is brought into contact with an obstacle and stopped to cause the switch to turn off, the position information of the arm is cleared with the result that a malfunction may occur at restart time as described above. In order to cope with this problem, in the system according to the present invention, the motor 2 is driven in the backward direction in step S1 of FIG. 4 (FIG. 6 (*a*)) and, when an obstacle interfere with the arm movement to cause the motor 2 to be in a locked state (FIG. 5 (*b*)), the flow advances from step S2 to step S5. Since this is the first lock detection, the flow advances from step S5 to step S6 where 1 is incremented to 0 of the lock count (0+1=1), and then the flow advances to step S7.

When the motor 2 is slightly driven in the forward path direction in step S7, the wiper arm separates from the obstacle and moves in the forward path direction (FIG. 6 (*c*)). Thereafter, after the motor 2 is returned by a specified amount in step S8, it is once again driven in the backward path direction in step S1. Then, the wiper arm is brought into contact once again with the obstacle to cause the motor 2 to be in a locked state as in the case of FIG. 6 (*b*). Thus, the flow advances from step S2 to step S5 where the number of motor lock detections is checked. At this time point, one motor lock has been detected. Assuming that n is 6, the number of motor lock detections does not reach the n (=6), so that the flow advances from step S5 to step S6 where 1 is incremented to 1 of the lock count (1+1=2), and then the flow advances to step S7.

In step S7, the motor 2 is slightly driven in the forward path direction once again as in the case of FIG. 6 (*c*) to cause the wiper arm to be separated from the obstacle. After the motor 2 is returned by a specified amount, the flow returns to step S1 (S8) where the motor 2 is once again driven in the backward path direction. Also at this time, the wiper arm is brought into contact once again with the obstacle to cause the motor 2 to be in a locked state, and the flow advances from step S2 to step S5. In step S5, the number of motor lock detections is checked. At this time point, n is 2, so that the flow advances to step S6 where 1 is incremented to 2 of the lock count (2+1=3), and then the flow advances to step S7.

As described above, in the case where there is an obstacle and the obstacle is not removed, the processing sequence "S2→S5→S6→S7→S8→S1→S2" is repeated to reciprocate the wiper arm in both the forward path direction and backward path direction. When the number of motor lock detections reaches 6 after the reciprocation is repeated five times, it is determined in step S5 that the number of motor rock detections reaches the n (=6). Then, the flow exits the routine without performing the wiping control of step S4. That is, in the case where the number of motor lock detections exceeds five times without being able to recognize the original point position in spite of the repetitive arm reciprocation, it is determined that there is any obstacle, whereby the motor 2 is stopped without performing the wiping control.

Therefore, according to the control method of the present invention, it is possible to accurately stop the wiper operation without falsely recognizing a locked state due to an obstacle as a locked state due to the lower limit, thereby preventing a malfunction from occurring due to existence of an obstacle. This prevents the case shown in FIG. 11 where the wiper blade overruns the upper turning position to collide with the A-pillar, thus preventing the wiper blade or car body from being damaged. In the control method according to the present invention, in the case where there is an obstacle such as snow or the like, the wiping operation is not performed and the wiper is in a rest state, as is the case with the conventional wiper system. Thus, the system is not damaged by a malfunction, so that normal wiping operation can be resumed after the obstacle has been removed.

The present invention is not limited to the above embodiments, and various modifications may be made without departing from the scope of the present invention.

For example, although in the above embodiment, the motor drive in the forward path direction by a specified amount in step S8 is controlled based on the number of pulse counts of the motor rotation pulse, it may be controlled using the timer 26 provided in the motor control unit 21. In this case, for example, the drive amount of the motor 2 in the forward path direction in step S7 is set to 1 second so as to cause the flow to return from step S8 to step S1 after elapse of 1 second. Further, the number of rotation direction changes of the motor 2 detected by the counter 25 may be used in place of the number of lock detections in step S5 to stop the motor 2 after it reaches a predetermined value.

Further, although the wiper apparatus according to the above embodiment has the storage position set below the lower turning position, the present invention is also applicable to a wiper apparatus having no wiper storage position. Further, the control method of the present invention is applicable not only to a wiper apparatus where the wiper arms at the driver seat and the passenger seat are driven to operate by a single motor and a single link mechanism but also to a wiper apparatus where the wiper arms at the driver seat and the passenger seat are driven to operate individually by separate motors. Additionally, the control method of the present invention is applicable not only to a wiper apparatus where the wiper arms are driven in parallel for wiping operation but also a wiper apparatus where the wiper arms are driven in opposite directions for a wiping operation.

Although the Hall IC is used as a means for detecting the rotation state and the rotation position of the motor in the above embodiments, the detection means of the present invention is not limited to the Hall IC and sensors using infrared rays or MR sensors (magnetoresistive effect element) may alternatively be used.

The invention claimed is:

1. A wiper control method comprising:
   driving a motor to rotate forwardly and reversely so as to reciprocate a wiper arm for a wiping operation; and
   controlling operation of the wiper arm according to an absolute position signal output when the wiper arm is located at a predetermined position and a relative position signal output in association with the rotation of the motor, said controlling including:
      moving the wiper arm in a predefined first direction at a start-up time of the wiper arm;
      when the motor is in a locked state before the absolute position signal is output, executing a reciprocation operation in which the wiper arm is moved once in a second direction opposite to the first direction, and then the wiper arm is moved once in the first direction; and
      when the absolute position signal has not yet been output even after the execution of the reciprocation operation, the reciprocation operation is executed once again.

2. The wiper control method of claim 1, further comprising:
   reversing a movement direction of the wiper arm at an upper turning position and a lower turning position;
   mechanically restricting movement of the wiper arm at an upper limit position and a lower limit position arranged beyond the upper turning position and the lower turning position, respectively; and
   outputting the absolute position signal at an original point position which is arranged between the lower limit position and lower turning position, and the first direction is the direction in which the wiper arm approaches the lower limit position.

3. A wiper control method comprising:
   driving a motor to rotate forwardly and reversely so as to reciprocate a wiper arm for a wiping operation; and
   controlling operation of the wiper arm according to an absolute position signal output when the wiper arm is located at a predetermined position and a relative position signal output in association with the rotation of the motor, said controlling including:
      moving the wiper arm in a predefined first direction at a start-up time of the wiper arm;
      when the motor is in a locked state before the absolute position signal is output, executing a reciprocation operation in which the wiper arm is moved once in a second direction opposite to the first direction, and then the wiper arm is moved once in the first direction;
      when the absolute position signal has not yet been output even after the execution of the reciprocation operation, the reciprocation operation is executed a predetermined number of times; and
      when the absolute position signal has not yet been output even after the reciprocation operation is executed the predetermined number of times, the motor is stopped.

4. The wiper control method of claim 3, further comprising:
   reversing a movement direction of the wiper arm at an upper turning position and a lower turning position;
   mechanically restricting movement of the wiper arm at an upper limit position and a lower limit position arranged beyond the upper turning position and the lower turning position, respectively; and
   outputting the absolute position signal at an original point position which is arranged between the lower limit position and lower turning position, and the first direction is the direction in which the wiper arm approaches the lower limit position.

5. A wiper control system comprising:
   a motor configured to rotate forwardly and reversely;
   a wiper arm driven by said motor;
   first sensor means for outputting an absolute position signal when said wiper arm is located at a predetermined position;
   second sensor means for outputting a relative position signal in association with the rotation of said motor;
   relative position signal detection means for detecting the relative position signal;
   lock detection means for detecting presence or absence of an occurrence of a locked state of said motor based on the relative position signal;
   motor rotation direction determination means for setting the rotation direction of said motor; and
   motor drive means for rotating said motor in a predetermined direction based on an instruction from said motor rotation direction determination means;
   wherein said motor rotation direction determination means is configured to rotate said motor in a predefined first direction at a start-up time of said wiper arm;
   wherein said motor rotation direction determination means is configured to, when said motor is in a locked state before the absolute position signal is output, execute a reciprocation operation of rotating said motor in a second direction opposite to the first direction a predetermined number of rotations or predetermined period of time and then rotate said motor in the first direction once again; and
   wherein said motor rotation direction determination means is configured to, when the absolute position signal has not yet been output even after the execution of the reciprocation operation, execute the reciprocation operation once again.

6. The wiper control system of claim 5, wherein said motor rotation direction determination means is configured to, when the absolute position signal has not yet been output even after the execution of the reciprocation operation, execute the reciprocation operation a predetermined number of times; and
   wherein said motor rotation direction determination means is configured to, when the absolute position signal has not yet been output even after the reciprocation operation is executed by a predetermined number of times, stop the motor.

7. The wiper control system of claim 6, further comprising a counter for counting the number of executions of the reciprocation operation.

8. The wiper control system of claim 5, further comprising a timer for controlling the reverse rotation time in the reciprocation operation.

* * * * *